(12) United States Patent
Chang

(10) Patent No.: US 9,104,034 B2
(45) Date of Patent: Aug. 11, 2015

(54) DISPLAY APPARATUS

(71) Applicant: AU OPTRONICS CORP., Hsin-Chu (TW)

(72) Inventor: Ching-Tsun Chang, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 0 days.

(21) Appl. No.: 14/056,195

(22) Filed: Oct. 17, 2013

(65) Prior Publication Data

US 2014/0132863 A1    May 15, 2014

(30) Foreign Application Priority Data

Nov. 15, 2012   (TW) .............................. 101142653 A

(51) Int. Cl.
*G02F 1/1335*    (2006.01)
*G02B 27/22*     (2006.01)
*H04N 13/04*     (2006.01)

(52) U.S. Cl.
CPC ........ *G02B 27/2214* (2013.01); *H04N 13/0404* (2013.01); *H04N 13/0452* (2013.01)

(58) Field of Classification Search
CPC .................. G02B 27/2214; H04N 13/0404
USPC .......................................................... 349/15
See application file for complete search history.

(56) References Cited

U.S. PATENT DOCUMENTS

| 2005/0254113 | A1 | 11/2005 | Cirkel et al. |
| 2007/0035672 | A1* | 2/2007 | Shestak et al. .................. 349/15 |
| 2012/0092339 | A1 | 4/2012 | Pijlman et al. |

FOREIGN PATENT DOCUMENTS

| CN | 1862314 | 11/2006 |
| CN | 101126840 | 2/2008 |
| CN | 101498841 | 8/2009 |
| WO | 2010150174 A1 | 12/2010 |

OTHER PUBLICATIONS

China Patent Office, "Office Action", Jun. 20, 2014.
Taiwan Patent Office, "Office Action", Jun. 20, 2014.

* cited by examiner

*Primary Examiner* — Thanh-Nhan P Nguyen
(74) *Attorney, Agent, or Firm* — WPAT, PC; Justin King

(57) ABSTRACT

A display apparatus includes a display panel, a polarization converting unit, a first micro-lens layer and a second micro-lens layer. The polarization converting unit is disposed on the display panel. The first micro-lens layer is disposed on the polarization converting unit and includes a plurality of first lenticular lenses parallel with and adjacent to each other. A first adjacent edge is formed between each two adjacent first lenticular lenses. The second micro-lens layer is disposed on the first micro-lens layer and includes a plurality of second lenticular lenses parallel with and adjacent to each other. A second adjacent edge is formed between each two adjacent second lenticular lenses. The first and second lenticular lenses are extended in a same direction and have a same width. There is an interval between an axis center line of each second lenticular lens and an axis center line of each first lenticular lens.

12 Claims, 8 Drawing Sheets

DISPLAY APPARATUS

FIELD OF THE INVENTION

The present invention relates to a display apparatus, and more particular to a display apparatus having a three-dimensional (3D) display mode and a two-dimensional (2D) display mode.

BACKGROUND OF THE INVENTION

In recent years, with the development of the display techniques, the 3D display is broadly used in television programs, movies, video games and so on. The conventional 3D display technique includes the glasses 3D display technique which may use pattern retarders, shutter glasses and so on, and the glasses-free 3D display technique which may use barriers, lenticular lenses and so on.

FIG. 1 is a schematic view showing a display principle of a conventional 3D display apparatus with lenticular lenses. Referring to FIG. 1, the conventional 3D display apparatus 100 includes a display panel 110 and lenticular lenses 120. The display panel 110 includes a pixel array. In the pixel array, odd pixels 112 for displaying left-eye signals L and even pixels 114 for displaying right-eye signals R are alternately arranged. The signals R and L respectively have a specific polarization direction.

When the left-eye signals L displayed by the odd pixels 112 leave the display panel 110 and enter the lenticular lenses 120, the left-eye signals L are refracted and the transmission direction of the left-eye signals L is changed since a refractive index of the lenticular lenses 120 is different from a refractive index of an external medium. A transmission path of the right-eye signals R is similar to a transmission path of the left-eye signals L, and the difference is a refractive angle of the right-eye signals R is contrary to a refractive angle of the left-eye signals L. After refracted by the lenticular lenses 120, the left-eye signals L and the right-eye signals R respectively enter a left-eye UL and a right-eye UR of a user U, and thus, the user U can feel that the displayed image frame is a 3D image frame.

In the display panel 110, a half of the pixels of the pixel array (i.e. the pixels 112) must be used to display the left-eye signals L, and the other half of the pixels of the pixel array (i.e. the pixels 114) must be used to display the right-eye signals R. Accordingly, an actual resolution of the conventional 3D display apparatus 100 is a half of a resolution of the pixel array. Therefore, it is an important object to prevent the resolution from being reduced when the display apparatus is in a 3D display mode.

SUMMARY OF THE INVENTION

An embodiment of the present invention provides a display apparatus including a display panel, a polarization converting unit, a first micro-lens layer and a second micro-lens layer. The polarization converting unit is disposed on the display panel. The first micro-lens layer is disposed on the polarization converting unit and includes a plurality of first lenticular lenses parallel with and adjacent to each other. A first adjacent edge is formed between each two adjacent first lenticular lenses. The second micro-lens layer is disposed on the first micro-lens layer and includes a plurality of second lenticular lenses parallel with and adjacent to each other. A second adjacent edge is formed between each two adjacent second lenticular lenses. The first lenticular lenses and the second lenticular lenses are extended in a same direction and have a same width. There is an interval between an axis center line of each second lenticular lens and an axis center line of each first lenticular lens.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
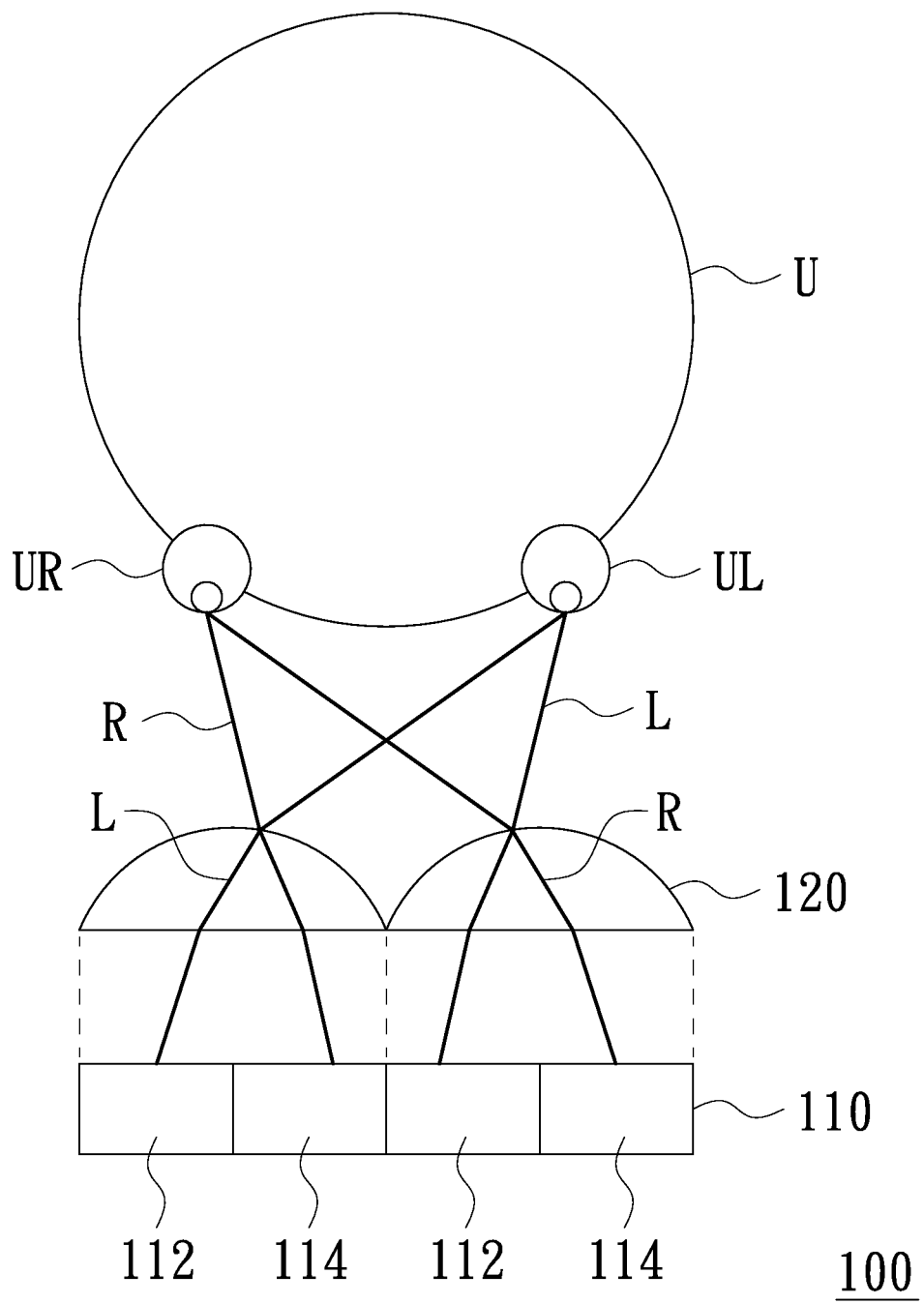
FIG. 1 is a schematic view showing a display principle of a conventional 3D display apparatus with lenticular lenses.
Figure 2:
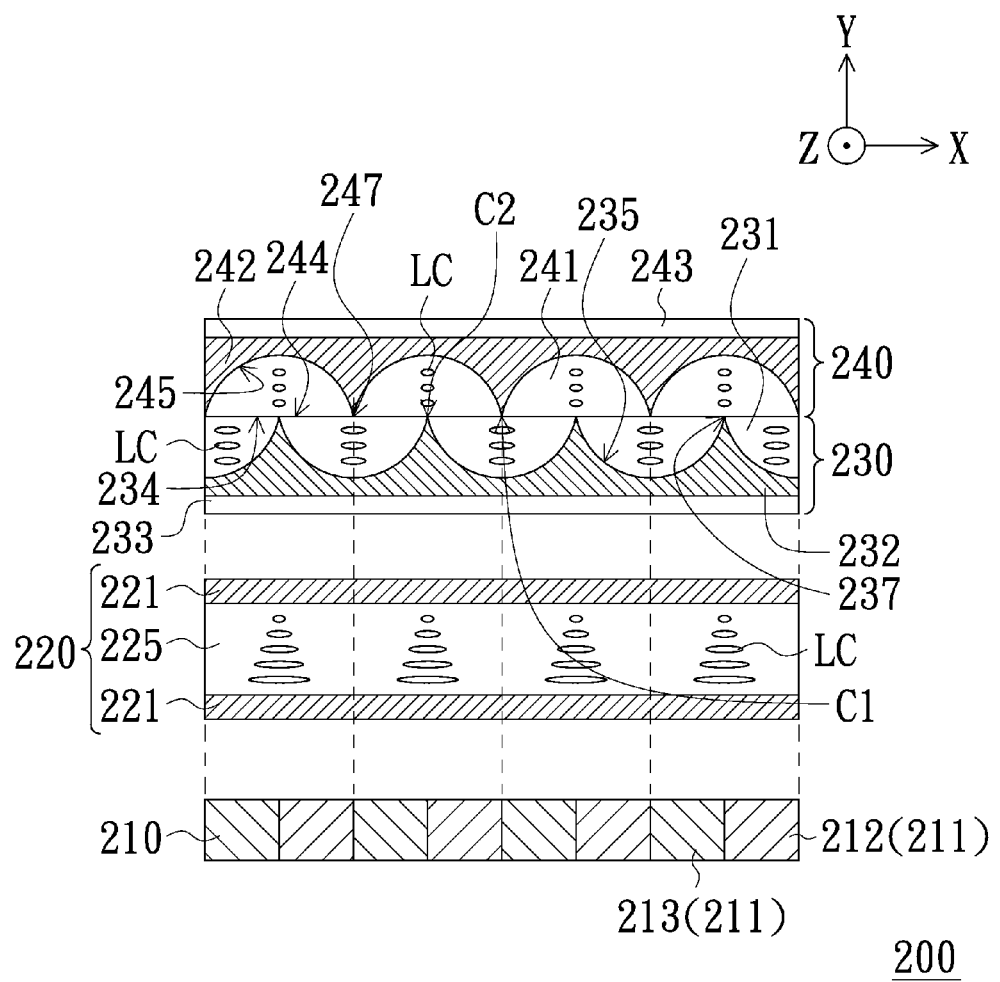
FIG. 2 is a schematic view of a display apparatus according to an embodiment of the present invention.

FIG. 2 is a schematic view of a display apparatus according to an embodiment of the present invention. Referring to FIG. 2, the display apparatus 200 includes a display panel 210, a polarization converting unit 220, a first micro-lens layer 230 and a second micro-lens layer 240. The polarization converting unit 220 is disposed on the display panel 210. The first micro-lens layer 230 is disposed on the polarization converting unit 220 and includes a plurality of first lenticular lenses 231 parallel with and adjacent to each other. A first adjacent edge 237 is formed between each two adjacent first lenticular lenses 231. The first lenticular lenses 231, for example, extend in a Z-axis direction, and the first adjacent edge 237, for example, also extends in the Z-axis direction. The second micro-lens layer 240 is disposed on the first micro-lens layer 230 and includes a plurality of second lenticular lenses 241 parallel with and adjacent to each other. A second adjacent edge 247 is formed between each two adjacent second lenticular lenses 241. The second lenticular lenses 241, for example, extend in the Z-axis direction, and the second adjacent edge 247, for example, also extends in the Z-axis direction. That is, the first lenticular lenses 231 and the second lenticular lenses 241 have a same extending direction. Moreover, the first lenticular lenses 231 and the second lenticular lenses 241 have a same width. There is an interval between an axis center line C2 of each second lenticular lens 241 extended in the Z-axis direction and an axis center line C1 of each first lenticular lens 231 extended in the Z-axis direction.

In the present embodiment, the axis center line C2 of each second lenticular lens 241 corresponds to the first adjacent edge 237. That is, a half of the width of the second lenticular lens 241 is stacked on one of two adjacent first lenticular lenses 231, and the other half of the width of the second lenticular lens 241 is stacked on the other one of the two adjacent first lenticular lenses 231. Each second lenticular lens 241 corresponds to the two adjacent first lenticular lenses 231. Further, the first micro-lens layer 230 and the second micro-lens layer 240 may be a passive activated micro-lens (PAM) layer, respectively.

The display panel 210 may be, but not limited to, a liquid crystal display panel or an organic light emitting diode display panel. The display panel 210 includes a pixel array, and in FIG. 2, the pixel array is drawn to represent the whole display panel 210. The pixel array includes a plurality of pixels 211 arranged in a plurality of rows, each first lenticular lens 231 corresponds to the pixels 211 of two of the rows, and each second lenticular lens 241 corresponds to the pixels 211 of two of the rows. More specifically, the rows of the pixel array are, for example, parallel to the Z-axis direction. The pixels 211 include a plurality of odd row pixels 212 and a plurality of even row pixels 213. Each first lenticular lens 231 corresponds to a set composed of the adjacent odd row pixels 212 and even row pixels 213. Each second lenticular lens 241 corresponds to another set composed of the adjacent odd row pixels 212 and even row pixels 213. An overlap portion of the first lenticular lens 231 and the second lenticular lens 241 corresponds to the pixels 211 of the same row.

Figure 3:
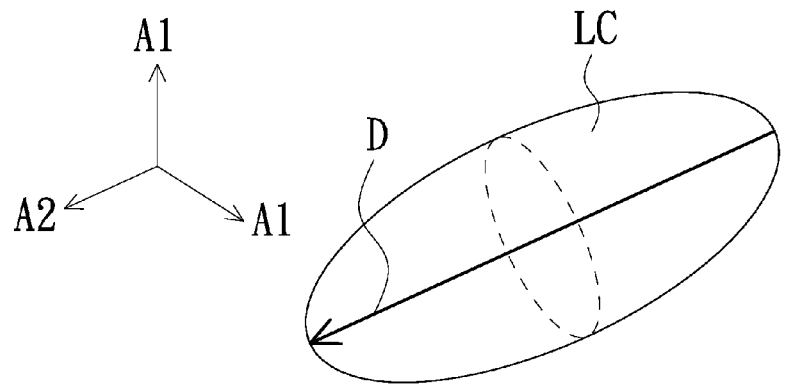
FIG. 3 is a schematic view of a liquid crystal molecule according to an embodiment of the present invention.

The first lenticular lenses 231 and the second lenticular lenses 241 respectively have a plurality of liquid crystal molecules LC therein. The liquid crystal molecules LC have a first light refractive index and a second light refractive index greater than the first light refractive index. FIG. 3 is a schematic view of a liquid crystal molecule according to an embodiment of the present invention. Referring to FIG. 3, the liquid crystal molecule LC has an anisotropic refractive index. When an oscillating direction of an electric field of light in the liquid crystal molecule LC is perpendicular to a major axis direction A2 of the liquid crystal molecule LC, the light is called as ordinary light. When the oscillating direction of the electric field of the light in the liquid crystal molecule LC is parallel with the major axis direction A2 of the liquid crystal molecule LC, the light is called as extraordinary light. An ordinary light refractive index ($n_o$) is the refractive index of the liquid crystal molecule LC relative to the ordinary light, an extraordinary light refractive index ($n_e$) is the refractive index of the liquid crystal molecules LC relative to the extraordinary light, and the extraordinary light refractive index is greater than the ordinary light refractive index. In the present embodiment, the first light refractive index may be, but not limited to, the ordinary light refractive index, and the second light refractive index may be, but not limited to, the extraordinary light refractive index.

More specifically, in the embodiment that the liquid crystal molecule LC is the uniaxial liquid crystal molecule, the first light refractive index ($n_o$) is a refractive index of a minor axis direction A1 of the liquid crystal molecule LC, and the second light refractive index ($n_e$) is a refractive index of the major axis direction A2 of the liquid crystal molecules LC. The liquid crystal molecule LC, for example, is a positive liquid crystal molecule, that is, an electric dipole moment D of the liquid crystal molecule LC is parallel with the major axis direction A2 of the liquid crystal molecules LC. One ordinarily skilled in the art should know the physical characteristics of the liquid crystal molecule LC, and thereby the detail description is omitted. Moreover, in the present invention, the liquid crystal molecule LC is not limited to the positive liquid crystal molecule. The present invention is not limited to use the uniaxial liquid crystal molecule although the uniaxial liquid crystal molecule is taken as the example to describe the meaning of the first light refractive index and the second light refractive index, the first light refractive index being the ordinary light refractive index, and the second light refractive index being the extraordinary light refractive index. In another embodiment, a biaxial liquid crystal molecule can be used. Since the physical characteristics of the biaxial liquid crystal molecule are similar to that of the uniaxial liquid crystal molecule and known by one ordinarily skilled in the art, the detail description is omitted.

Referring to FIG. 2, the liquid crystal molecules LC of the first lenticular lens 231 are arranged in a first direction (e.g. an X-axis direction), and the liquid crystal molecules LC of the second lenticular lens 241 are arranged in a second direction (e.g. the Z-axis direction), wherein the first direction is perpendicular to the second direction. In other words, major axes of the liquid crystal molecules LC of the first lenticular lens 231 are parallel with the first direction, and major axes of the liquid crystal molecules LC of the second lenticular lens 241 are parallel with the second direction.

The polarization converting unit 220 may include two electrode layers 221 and a liquid crystal layer 225 disposed between the electrode layers 221, wherein each of the electrode layers 221 is, for example, a sheet electrode. A boundary of the liquid crystal layer 225 near to the upper electrode layer 221 is, for example, aligned to the Z-axis direction, another boundary of the liquid crystal layer 225 near to the lower electrode layer 221 is, for example, aligned to the X-axis direction, and thus the liquid crystal molecules LC of the liquid crystal layer 225 are arranged twisted. An alignment process may be, but not limited to, a rubbing process or a photo alignment process. Moreover, the polarization converting unit 220 of the present embodiment may be, but not limited to, a twisted-nematic liquid crystal cell (TN-LC cell). In other embodiments, the polarization converting unit 220 may be a fringe field switching liquid crystal cell (FFS-LC cell), an optically compensated bend liquid crystal cell (OCB-LC cell) or a polymer sustained alignment liquid crystal cell (PSA-LC cell).

Referring to FIG. 2, the first micro-lens layer 230 may further include a first cover layer 232 to cover the first lenticular lenses 231, the second micro-lens layer 240 may further include a second cover layer 242 to cover the second lenticular lenses 241, and the first cover layer 232 and the second cover layer 242 respectively have a same third refractive index. The third refractive index is, for example, substantially equal to the first light refractive index.

The first micro-lens layer 230 may further include a first substrate 233 disposed on the first cover layer 232, and the first cover layer 232 is located between the first substrate 233 and the first lenticular lenses 231. The second micro-lens layer 240 may further include a second substrate 243 disposed on the second cover layer 242, and the second cover layer 242 is located between the second substrate 243 and the second lenticular lenses 241. Each first lenticular lens 231 has a first flat surface 234 and a first curved surface 235 connected to the first flat surface 234. Each second lenticular lens 241 has a second flat surface 244 and a second curved surface 245 connected to the second flat surface 244. In the present embodiment, the first flat surface 234 and the second flat surface 244 are, for example, faced to each other.

Figure 4A:
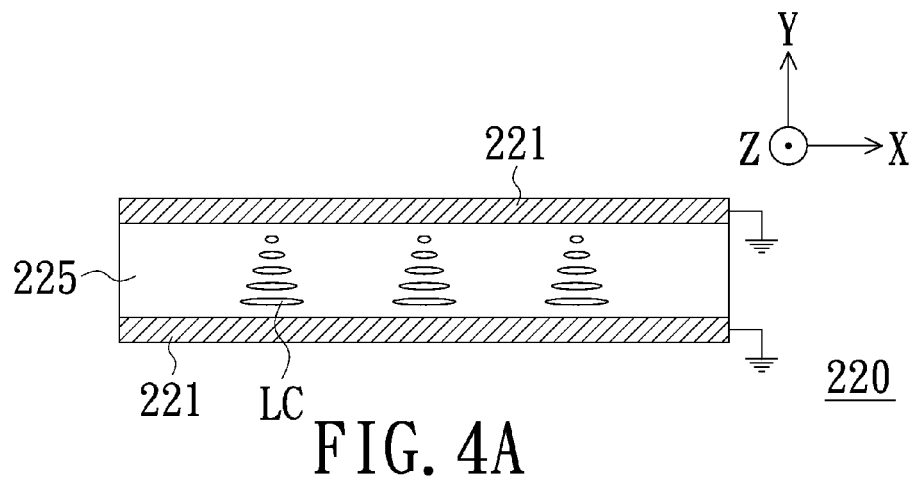
FIGS. 4A and 4B are schematic views showing the polarization converting unit of the display apparatus of FIG. 2 in two different states.
Figure 4B:
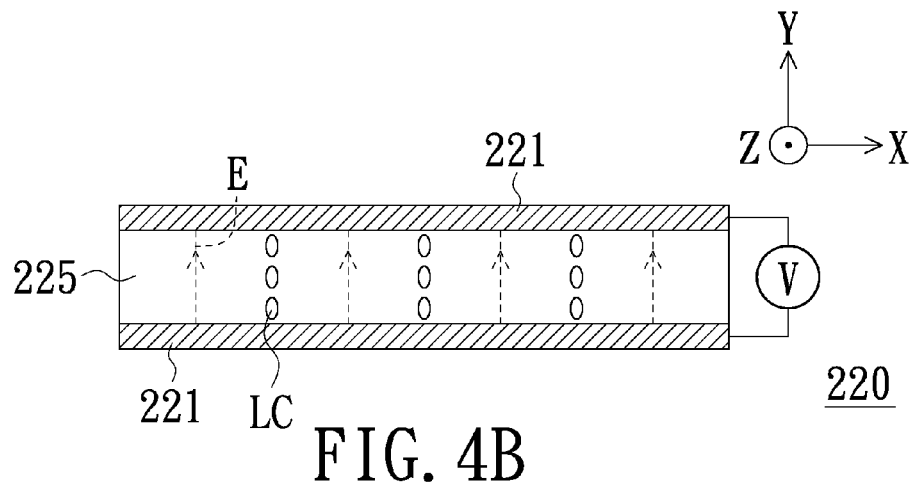
Figure 5A:
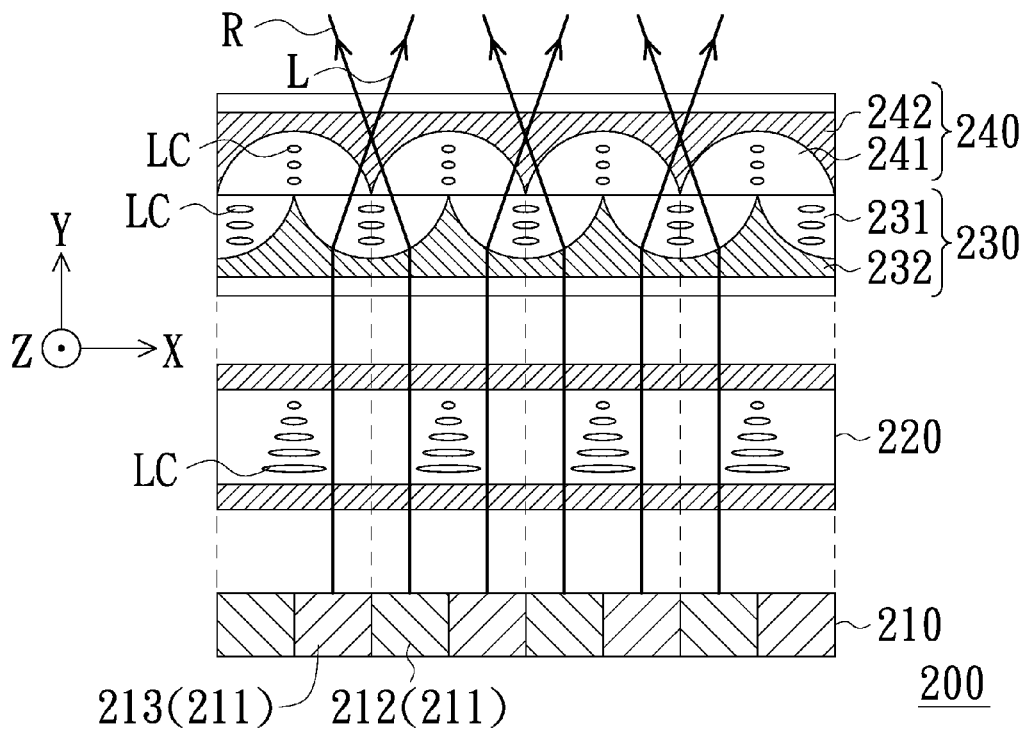
FIGS. 5A and 5B are schematic views showing an operating manner of the display apparatus of FIG. 2.

FIGS. 4A and 4B are schematic views showing the polarization converting unit of the display apparatus of FIG. 2 in two different states. Referring to FIGS. 4A and 4B, the polarization converting unit 220 can be alternately switched between a first state and a second state. For example, in the first state, the liquid crystal molecules LC are arranged twisted, and in the second state, the major axes of the liquid crystal molecules LC are arranged in a Y-axis direction. More specifically, when the polarization converting unit 220 is switched to the first state, a same voltage is applied to the two electrode layers 221. Thus, there is no electric field between the two electrode layers 221, and the liquid crystal molecules LC are arranged twisted. When the polarization converting unit 220 is switched to the second state, two different voltages are respectively applied to the two electrode layers 221. Thus, there is an electric field E between the two electrode layers 221, and the electric field E is a vector field extending in the Y-axis direction. To decrease orientation energy of the liquid crystal molecules LC in the electric field E, the electric dipole moment D of the liquid crystal molecules LC is parallel with the direction of the electric field E, such that, in the second state, the major axes of the liquid crystal molecules LC can be arranged in the Y-axis direction. Referring to FIG. 5A, the image frame displayed by the display panel 210 has a polarization direction (e.g. the X-axis direction).

When the polarization converting unit 220 is switched to the first state, the polarization converting unit 220 has a wave guiding characteristic and utilizes the birefringence of the liquid crystal molecules LC to change the polarization direction of the image frame. When the polarization converting unit 220 is switched to the second state, the polarization converting unit 220 is a medium with single refractive index and can't change the polarization direction of the image frame. Moreover, the switching frequency between the first state and the second state of the polarization converting unit 220 may be equal to the image frame refresh frequency of the display panel 210. More specifically, the display apparatus 200 of the present embodiment utilizes a time-division manner to divide each image frame into a first sub-image frame displayed in a first time and a second sub-image frame displayed in a second time, and utilizes the polarization converting unit 220 to change the polarization direction of the image signals of the first sub-image frame or the second sub-image frame, so as to change the refractive direction of the image signals. In the embodiment, the image frame refresh frequency means the refresh frequency of the sub-image frame.

Figure 5B:
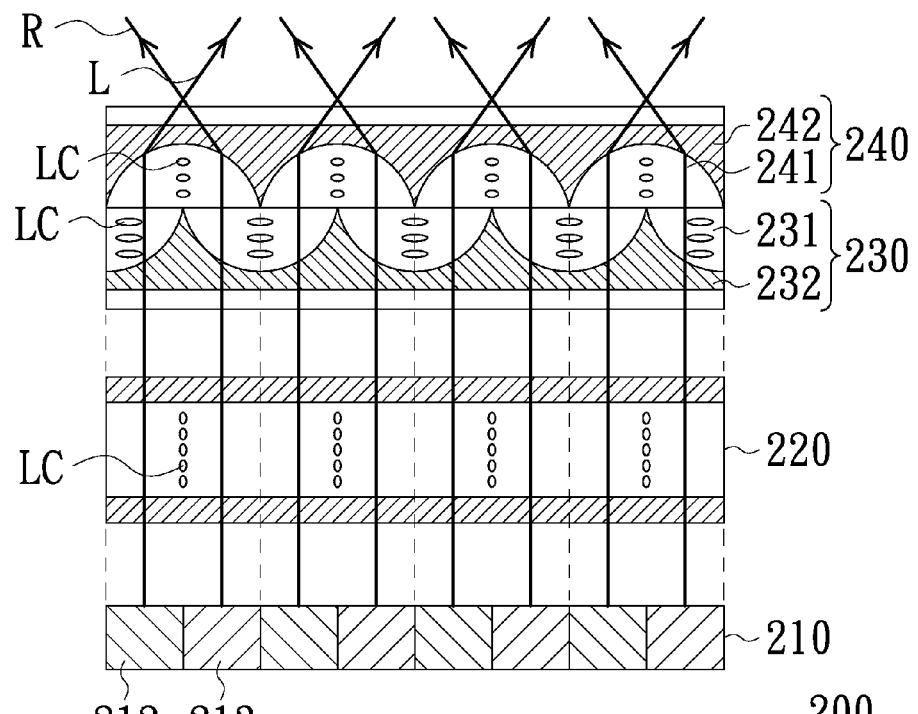

The operating manner of the 3D display mode of the display apparatus 200 will be described hereinafter. Referring to FIGS. 5A and 5B, when the first sub-image frame is displayed in the first time (as shown in FIG. 5A), the polarization converting unit 220 is switched to the first state, the odd row pixels 212 of the display panel 210 may display right-eye signals R, and the even row pixels 213 may display left-eye signals L. When the second sub-image frame is displayed in the second time (as shown in FIG. 5B), the polarization converting unit 220 is switched to the second state, the odd row pixels 212 of the display panel 210 may display the left-eye signals L, and the even row pixels 213 may display the right-eye signals R.

Referring to FIG. 5A, when the polarization converting unit 220 is switched to the first state, the right-eye signals R displayed by the odd row pixels 212 enter the polarization converting unit 220, and the polarization direction of the right-eye signals R is, for example, parallel with minor axes of the lowest liquid crystal molecules LC of the polarization converting unit 220. The polarization direction of the right-eye signals R is changed by the polarization converting unit 220. Thus, when the right-eye signals R enter the first micro-lens layer 230, the polarization direction of the right-eye signals R is parallel with the major axes of the liquid crystal molecules LC of the first micro-lens layer 230. Since the third refractive index of the first cover layer 232 is different from the second light refractive index ($n_e$) of the liquid crystal molecules LC of the first lenticular lenses 231, the right-eye signals R are refracted at an interface between the first cover layer 232 and the first lenticular lenses 231. Moreover, the liquid crystal molecules LC of the first lenticular lenses 231 and the second lenticular lenses 241 are aligned homogeneously, and optical axes of the liquid crystal molecules LC of the first lenticular lenses 231 are perpendicular to optical axes of the liquid crystal molecules LC of the second lenticular lenses 241. Thus, when the light whose polarization direction is parallel with the major axes of the liquid crystal molecules LC of the first lenticular lenses 231 transmits to the second lenticular lenses 241, the polarization direction of the light is parallel with the minor axes of the liquid crystal molecules LC of the second lenticular lenses 241. Such that, the right-eye signals R are not refracted at an interface between the second cover layer 242 and the second lenticular lenses 241, and the right-eye signals R can be refracted to a right eye of a user by the first micro-lens layer 230.

Referring to FIG. 5B, when the polarization converting unit 220 is switched to the second state, the right-eye signals R displayed by the even row pixels 213 enter the polarization converting unit 220, and the polarization direction of the right-eye signals R is not changed by the polarization converting unit 220. Thus, when the right-eye signals R enter the first micro-lens layer 230, the polarization direction of the right-eye signals R is parallel with the minor axes of the liquid crystal molecules LC of the first micro-lens layer 230. Since the third refractive index of the first cover layer 232 is the same with the first light refractive index ($n_o$) of the liquid crystal molecules LC of the first lenticular lenses 231, the right-eye signals R are not refracted at the interface between the first cover layer 232 and the first lenticular lens 231, and thus, the right-eye signals R enter the second micro-lens layer 240 in the original transmission direction. Moreover, the liquid crystal molecules LC of the first lenticular lenses 231 and the second lenticular lenses 241 are aligned homogeneously, and the optical axes of the liquid crystal molecules LC of the first lenticular lenses 231 are perpendicular to the optical axes of the liquid crystal molecules LC of the second lenticular lenses 241. Thus, when the light whose polarization direction is parallel with the minor axes of the liquid crystal molecules LC of the first lenticular lenses 231 transmits to the second lenticular lenses 241, the polarization direction of the light is parallel with the major axes of the liquid crystal molecules LC of the second lenticular lenses 241. Such that, the right-eye signals R are refracted at the interface between the second cover layer 242 and the second lenticular lenses 241 and refracted to the right eye of the user since the third refractive index of the second cover layer 242 is different from the second light refractive index ($n_e$) of the liquid crystal molecules LC of the second lenticular lenses 241.

Accordingly, the right eye of the user can receive the right-eye signals R displayed by the odd row pixels 212 in the first time, and receive the right-eye signals R displayed by the even row pixels 213 in the second time. Therefore, in a same image frame time (including the first time and the second time), the right eye of the user can receive the right-eye signals R displayed by the odd row pixels 212 and the even row pixels 213.

Similarly, a left eye of the user can receive the left-eye signals L displayed by the even row pixels 213 in the first time, and receive the left-eye signals L displayed by the odd row pixels 212 in the second time. Therefore, in a same image frame time (including the first time and the second time), the left eye of the user can receive the left-eye signals L displayed by the odd row pixels 212 and the even row pixels 213. Accordingly, in the 3D display mode, the left eye and the right eye of the user can respectively receive the signals displayed by all of the pixels, such that the resolution of the display apparatus 200 of the present embodiment is not reduced in 3D display mode.

The operating manner of a 2D display mode of the display apparatus 200 is similar to the operating manner of the 3D display mode, and the main difference is the odd row pixels 212 and the even row pixels 213 display common 2D signals in 2D display mode, rather than respectively display the left-eye signals L and the right-eye signals R. Therefore, the display apparatus 200 have the same resolution in 2D display mode and 3D display mode.

Figure 6A:
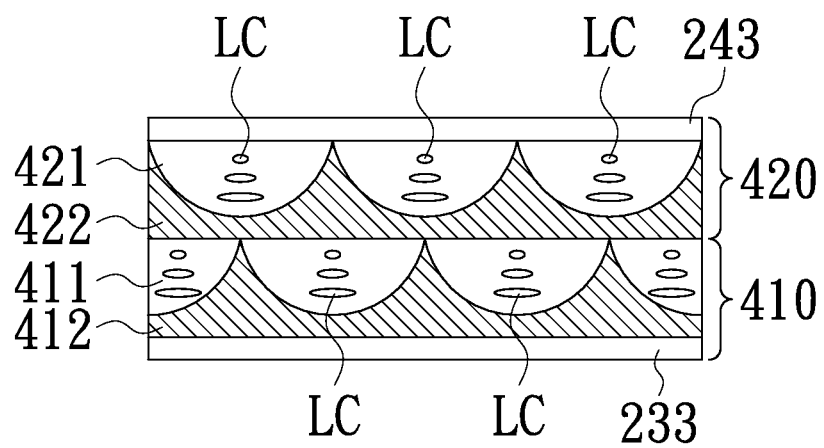
FIG. 6A is a schematic view of a micro-lens layer of a display apparatus according to another embodiment of the present invention.

FIG. 6A is a schematic view of micro-lens layers according to another embodiment of the present invention. Referring to FIG. 6A, the function and structure of the first micro-lens layer 410 and the second micro-lens layer 420 are similar to that of the first micro-lens layer 230 and the second micro-lens layer 240 of FIG. 2, and the main difference is the arranging manner of the liquid crystal molecules LC. In detail, the first lenticular lenses 411 and the first cover layer 412 are disposed on the first substrate 233, and the second lenticular lenses 421 and the second cover layer 422 are disposed on the second substrate 243. The liquid crystal molecules LC of the first lenticular lenses 411 of the first micro-lens layer 410 and the liquid crystal molecules LC of the second lenticular lenses 421 of the second micro-lens layer 420 are arranged twisted. In other words, the liquid crystal molecules LC of the first lenticular lenses 411 and the second lenticular lenses 421 are provided under a twisted alignment. An arranging direction of the liquid crystal molecules LC of the first lenticular lenses 411 closest to the second micro-lens layer 420 is, for example, perpendicular to an arranging direction of the liquid crystal molecules LC of the second lenticular lenses 421 closest to the first micro-lens layer 410. However, in the present invention, a twisted angle of the liquid crystal molecules LC provided under the twisted alignment may be, but not limited to, 90 degrees.

Figure 6B:
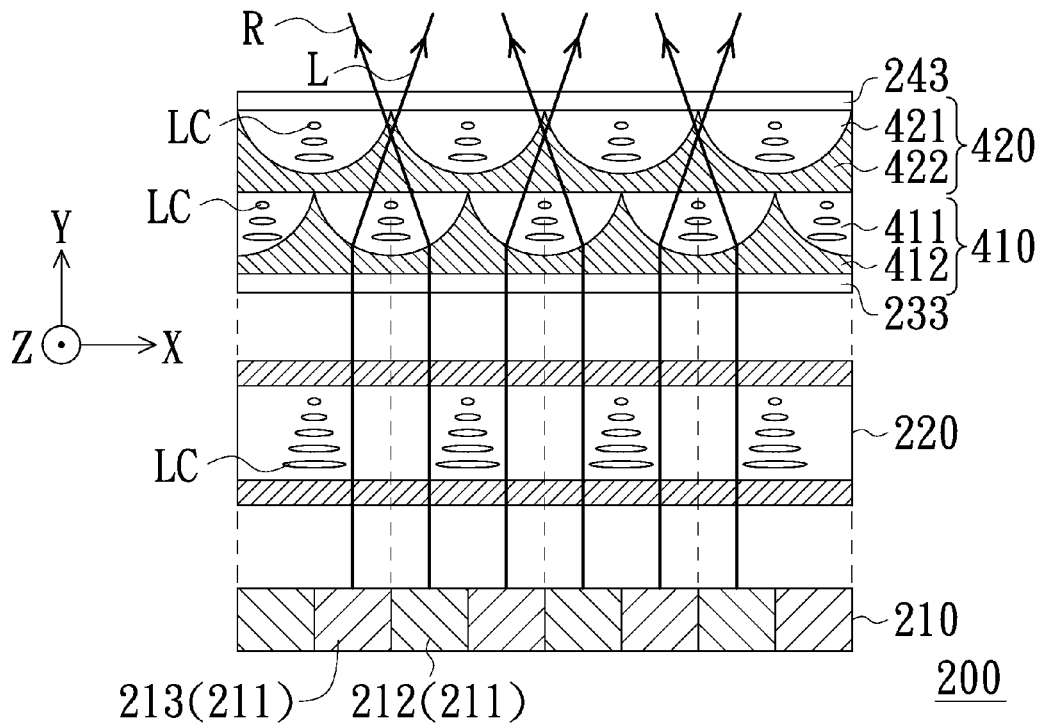
FIGS. 6B and 6C are schematic views showing an operating manner of the display apparatus having the micro-lens layers of FIG. 6A.

The operating manner of the display apparatus having the micro-lens layers of FIG. 6A will be described hereinafter in accompany with FIGS. 6A and 6B. Referring to FIG. 6B, when the polarization converting unit 220 is switched to the first state, the right-eye signals R displayed by the odd row pixels 212 enter the polarization converting unit 220, and the polarization direction of the right-eye signals R is, for example, parallel with the minor axes of the lowest liquid crystal molecules LC of the polarization converting unit 220, and the polarization direction of the right-eye signals R is changed by the polarization converting unit 220. When the right-eye signals R enter the first micro-lens layer 410, the polarization direction of the right-eye signals R is parallel with the major axes of the liquid crystal molecules LC of the first micro-lens layer 410. Since the third refractive index of the first cover layer 412 is different from the second light refractive index ($n_e$) of the liquid crystal molecules LC of the first lenticular lenses 411, the right-eye signals R are refracted at the interface between the first cover layer 412 and the first lenticular lenses 411. Furthermore, since the liquid crystal molecules LC of the first lenticular lenses 411 and the liquid crystal molecules LC of the second lenticular lenses 421 are provided under the twisted alignment, the polarization direction of the light passing through the liquid crystal molecules LC of the first lenticular lenses 411 is rotated 90 degrees, and thus the polarization direction of the light is parallel with the minor axes of the liquid crystal molecules LC of the second lenticular lenses 421. Accordingly, the right-eye signals R are not refracted at the interface between the second cover layer 422 and the second lenticular lens 241, and the right-eye signals R are refracted to the right eye of the user by the first micro-lens layer 410.

Figure 6C:
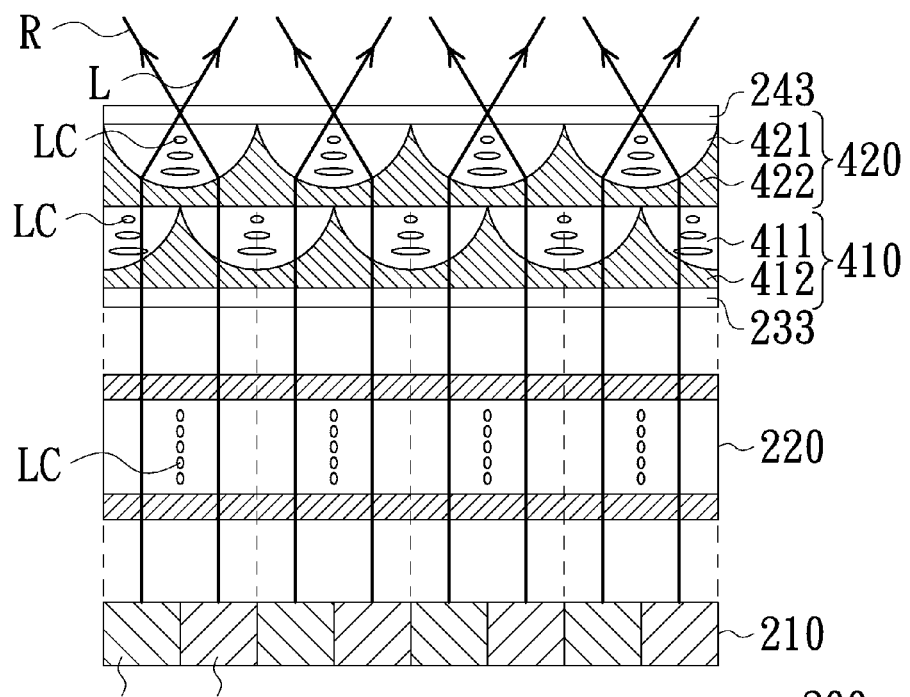

Referring to FIG. 6C, when the polarization converting unit 220 is switched to the second state, the right-eye signals R displayed by the even row pixels 213 enter the polarization converting unit 220. The polarization direction of the right-eye signals R is not changed by the polarization converting unit 220. When the right-eye signals R enter the first micro-lens layer 410, the polarization direction of the right-eye signals R is parallel with the minor axes of the liquid crystal molecules LC of the first micro-lens layer 410. Since the third refractive index of the first cover layer 412 is the same with the first light refractive index ($n_o$) of the liquid crystal molecules LC of the first lenticular lens 411, the right-eye signals R are not refracted at the interface between the first cover layer 412 and the first lenticular lens 411. Furthermore, since the liquid crystal molecules LC of the first lenticular lens 411 and the liquid crystal molecules LC of the second lenticular lens 421 are provided under the twisted alignment, the polarization direction of the light passing through the liquid crystal molecules LC of the first lenticular lenses 411 is rotated 90 degrees, and thus the polarization direction of the light is parallel with the major axes of the liquid crystal molecules LC of the second lenticular lenses 421. Since the third refractive index of the second cover layer 422 is different from the second light refractive index ($n_e$) of the liquid crystal molecules LC of the second lenticular lenses 421, the right-eye signals R are refracted at the interface between the second cover layer 422 and the second lenticular lens 421 and refracted to the right eye of the user.

Accordingly, the right eye of the user can receive the right-eye signals R displayed by the odd row pixels 212 in the first time and the right-eye signals R displayed by the even row pixels 213 in the second time. Therefore, in a same image frame time (including the first time and the second time), the right eye of the user can receive the right-eye signals R displayed by the odd row pixels 212 and the even row pixels 213. Similarly, in a same image frame time (including the first time and the second time), the left eye of the user can receive the left-eye signals L displayed by the odd row pixels 212 and the even row pixels 213.

Figure 7:
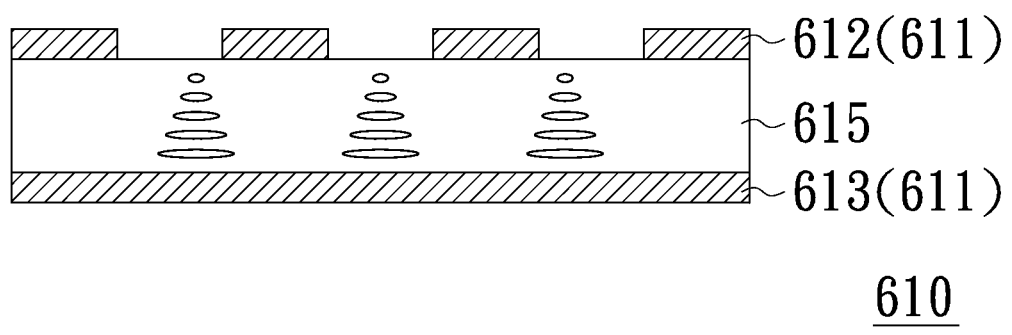
FIG. 7 is a schematic view of a polarization converting unit of a display apparatus according to another embodiment of the present invention.

FIG. 7 is a schematic view of a polarization converting unit of a display apparatus according to another embodiment of the present invention. Referring to FIG. 7, the polarization converting unit 610 of the present embodiment and the polarization converting unit 220 of FIG. 2 have similar function and structure, and the main difference is the structure of the electrode layers 611. One of the electrode layers 611 of the polarization converting unit 610 includes a plurality of stripe electrodes 612, and the other one of the electrode layers 611 is a sheet electrode 613 overlapped with the stripe electrodes 612. Moreover, the stripe electrodes 612 are, for example, disposed above the liquid crystal layer 615. In another embodiment, the stripe electrodes 612 may be disposed under the liquid crystal layer 615.

Figure 8A:
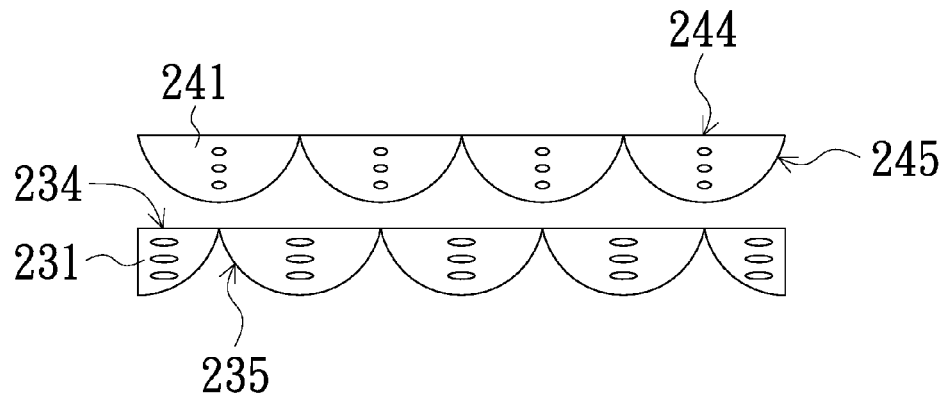
FIG. 8A is a schematic view showing a layout of two micro-lens layers according to another embodiment of the present invention.
Figure 8B:
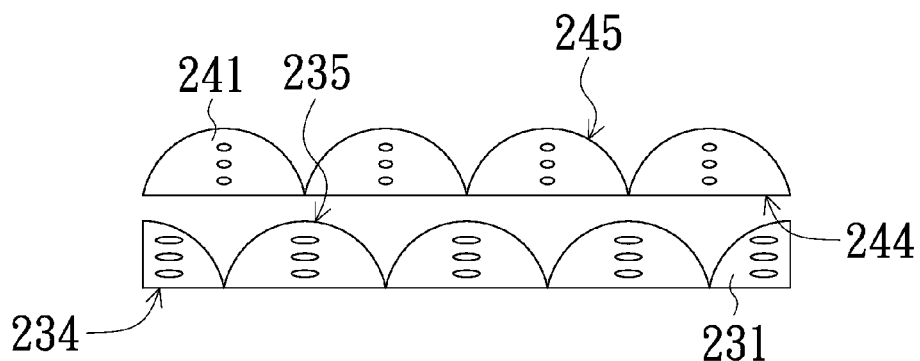
FIG. 8B is a schematic view showing a layout of two micro-lens layers according to another embodiment of the present invention.
Figure 8C:
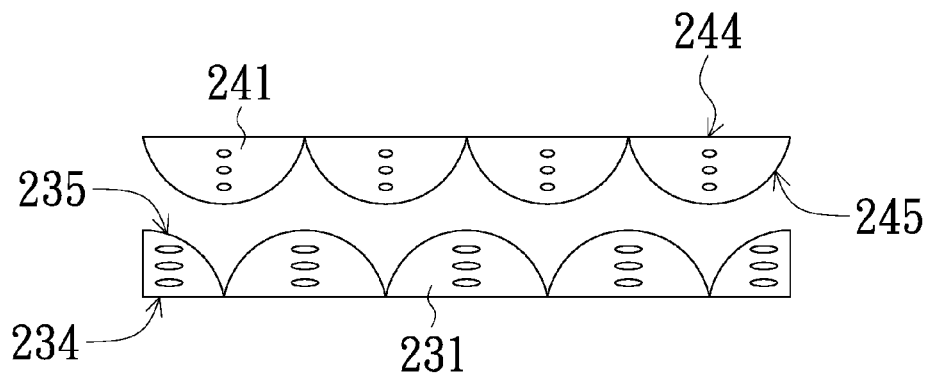
FIG. 8C is a schematic view showing a layout of two micro-lens layers according to another embodiment of the present invention.

FIGS. 8A to 8C are schematic views respectively showing a layout of two micro-lens layers according to another three embodiments of the present invention. The micro-lens layers of FIGS. 8A to 8C and the micro-lens layers of FIG. 2 have similar function and structure, the difference is the layout of the first lenticular lens 231 and the second lenticular lens 241, and only the difference will be described hereinafter. In FIG. 8A, the first flat surface 234 of the first lenticular lens 231 and the second curved surface 245 of the second lenticular lens 241 are faced to each other. In FIG. 8B, the first curved surface 235 of the first lenticular lens 231 and the second flat surface 244 of the second lenticular lens 241 are faced to each other. In FIG. 8C, the first curved surface 235 of the first lenticular lens 231 and the second curved surface 245 of the second lenticular lens 241 are faced to each other. The present invention is not limited to any one of the above-mentioned layouts. Moreover, the liquid crystal molecules of FIGS. 8A to 8C also can be arranged twisted.

In summary, the present invention utilizes the time-division manner to divide each image frame into the first sub-image frame displayed in the first time and the second sub-image frame displayed in the second time, and utilizes the polarization converting unit to change the polarization direction of the first sub-image frame or the second sub-image frame, so as to change the refractive direction of the image signals. Such that, in each image frame time, the two different signals displayed in the first time and the second time by each pixel can respectively transmit to the two different eyes of the user. Therefore, the display apparatus of the present invention have the same resolution in 2D display mode and 3D display mode, and the resolution is substantially the actual resolution of the display panel.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A display apparatus, comprising:
   a display panel comprises a pixel array, the pixel array comprises a plurality of pixels arranged in a plurality of rows wherein the pixels comprises a plurality of odd row pixels and a plurality of even row pixels;
   a polarization converting unit disposed on the display panel;
   a first micro-lens layer disposed on the polarization converting unit and comprising a plurality of first lenticular lenses parallel with and adjacent to each other, a first adjacent edge being formed between each two adjacent first lenticular lenses; and
   a second micro-lens layer disposed on the first micro-lens layer and comprising a plurality of second lenticular lenses parallel with and adjacent to each other, a second adjacent edge being formed between each two adjacent second lenticular lenses, the first lenticular lenses and the second lenticular lenses being extended in a same direction and having a same width, there being an interval between an axis center line of each second lenticular lens and an axis center line of each first lenticular lens, and each first lenticular lens corresponding to the pixels of two of the rows, and each second lenticular lens corresponding to the pixels of two of the rows, wherein when the display apparatus is operated in a 3D display mode during an image frame time comprising a first time and a second time, a right eye of an user receives a plurality of right-eye signals displayed by the odd row pixels in the first time and receives the right-eye signals displayed by the even row pixels in the second time, a left eye of the user receives a plurality of left-eye signals displayed by the even row pixels in the first time and receives the left-eye signals displayed by the odd row pixels in the second time, and when the display apparatus is operated in a 2D display mode during the image frame time, the signals displayed by the pixels are simultaneously received by both eyes of the user during an image frame time.

2. The display apparatus according to claim 1, wherein the axis center line of each second lenticular lens corresponds to one of the first adjacent edges.

3. The display apparatus according to claim 1, wherein the first lenticular lenses and the second lenticular lenses respectively have a plurality of liquid crystal molecules therein, and the liquid crystal molecules have a first light refractive index and a second light refractive index greater than the first light refractive index.

4. The display apparatus according to claim 3, wherein the first micro-lens layer further comprises a first cover layer covering the first lenticular lenses, the second micro-lens layer further comprises a second cover layer covering the second lenticular lenses, the first cover layer and the second cover layer respectively have a same third refractive index, and the third refractive index is substantially equal to the first light refractive index.

5. The display apparatus according to claim 4, wherein the liquid crystal molecules of the first lenticular lenses are arranged in a first direction, and the liquid crystal molecules of the second lenticular lenses are arranged in a second direction, and the first direction is perpendicular to the second direction.

6. The display apparatus according to claim 4, wherein the liquid crystal molecules of the first lenticular lenses and the second lenticular lenses are arranged twisted, and an arranging direction of the liquid crystal molecules of each first lenticular lens closest to the second micro-lens layer is perpendicular to an arranging direction of the liquid crystal molecules of each second lenticular lens closest to the first micro-lens layer.

7. The display apparatus according to claim 4, wherein the first cover layer is located between the first lenticular lenses and the polarization converting unit, and the second lenticular lenses are located between the first micro-lens layer and the second cover layer.

8. The display apparatus according to claim 7, wherein the first micro-lens layer further comprises a first substrate disposed on the first cover layer, the first cover layer is located between the first substrate and the first lenticular lenses, the second micro-lens layer further comprises a second substrate disposed on the second cover layer, and the second cover layer is located between the second substrate and the second lenticular lenses.

9. The display apparatus according to claim 1, wherein each first lenticular lens has a first flat surface and a first curved surface connected to the first flat surface, each second lenticular lens has a second flat surface and a second curved surface connected to the second flat surface, and the first flat surface and the second flat surface are faced to each other.

10. The display apparatus according to claim 1, wherein each first lenticular lens has a first flat surface and a first curved surface connected to the first flat surface, each second lenticular lens has a second flat surface and a second curved surface connected to the second flat surface, and the first flat surface and the second curved surface are faced to each other.

11. The display apparatus according to claim 1, wherein each first lenticular lens has a first flat surface and a first curved surface connected to the first flat surface, each second lenticular lens has a second flat surface and a second curved surface connected to the second flat surface, and the first curved surface and the second flat surface are faced to each other.

12. The display apparatus according to claim 1, wherein each first lenticular lens has a first flat surface and a first curved surface connected to the first flat surface, each second lenticular lens has a second flat surface and a second curved surface connected to the second flat surface, and the first curved surface and the second curved surface are faced to each other.

\* \* \* \* \*